Patented Nov. 20, 1951

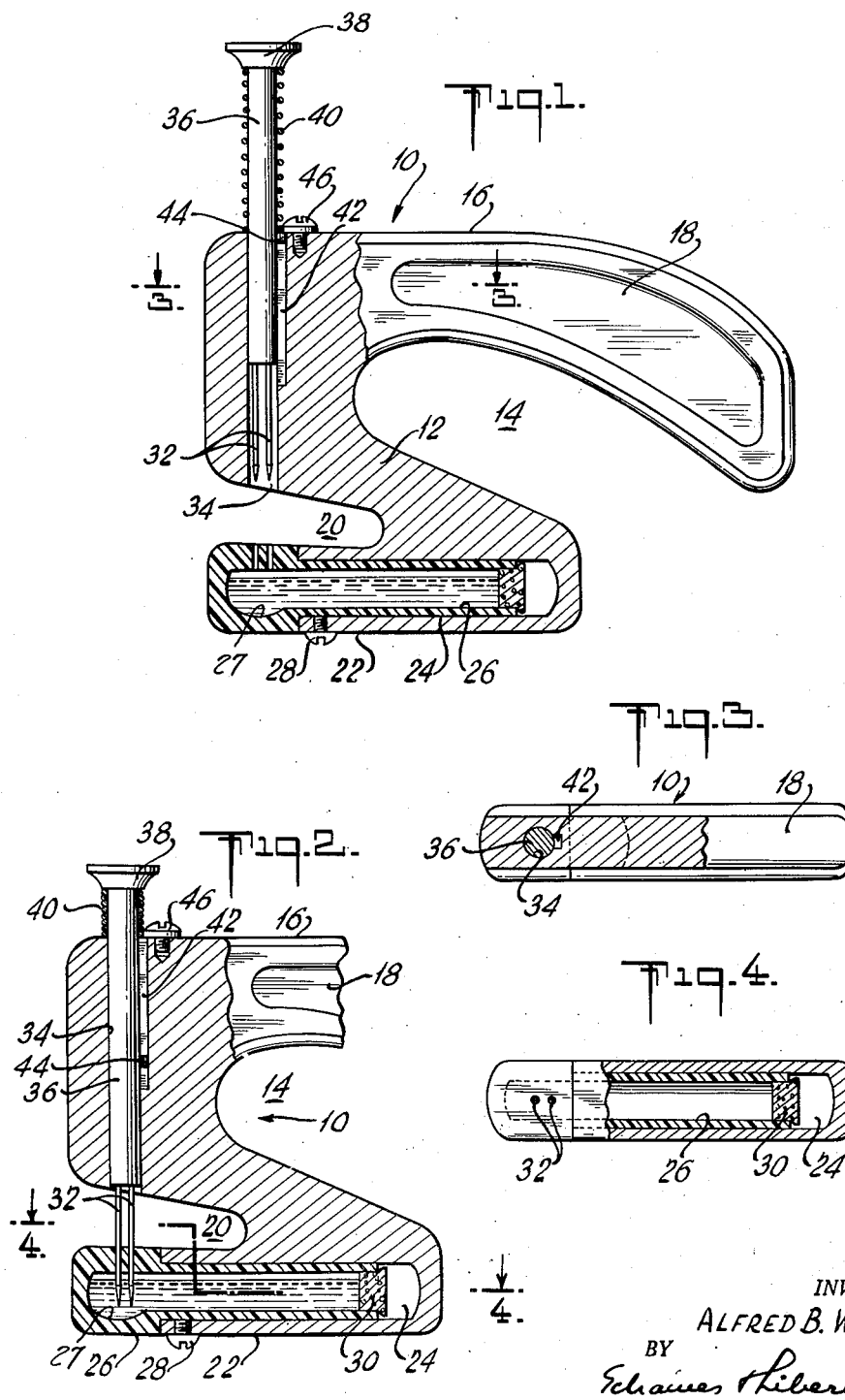

2,575,648

UNITED STATES PATENT OFFICE 2,575,648

POULTRY AND LIVESTOCK INOCULATOR

Alfred B. Willson, East Hartford, Conn.

Application April 26, 1950, Serial No. 158,093

3 Claims. (Cl. 128—253)

The present invention relates to devices for inoculating poultry or other alate animals as well as such livestock as pigs, cows, sheep, etc., with serum or other medicaments. While the device will be described in relation to its use with alate animals as poultry, it will be obvious that its field or use is not so limited and the device applies equally well to the treatment of livestock, as pigs, cows, sheep, etc. The invention is to be circumscribed only by the scope of the appended claims.

The main object of the present invention is the provision of a device of the character described which is generally S-shaped in side elevation, which can be held in and operated by one hand of the user, leaving the other hand free to hold the animal being treated.

Another important object of the present invention is the provision of an inoculator for alated animals, livestock, and the like, which comprises a member having a pair of recesses extending inwardly from opposite sides of the member to define a handle at one end and a wing-receiving recess at the other end, the term "wing" being used hereinafter, and in the appended claims to denote any portion of the animal receivable within and operable on by my device. In the case of alate animals, the wing is engaged and operated on by my device. For such animals as pigs, cows, sheep, etc., the ears may be engaged, or any other easily engageable portion of slack skin may be inserted within the recess.

Another object of the present invention is the provision of a device of the character described which comprises a body portion, a handle at one end thereof, a wing-receiving recess at the other end thereof, and means operable from a point adjacent the handle to inject serum into a wing received within the recess.

Another object of my invention is the provision of a device of the character described which comprises a body portion having a plunger slidably and reciprocably disposed therewithin, a needle at an end of the plunger, a handle on one side thereof, and a wing-receiving recess at the other side thereof, a serum containing arm below the recess, the plunger being actuatable from a point adjacent the handle to extend the needle across the recess and into the serum container.

An associated object of the present invention is the provision, in a device as described hereinabove, of a replaceable serum container.

Other, further and more detailed objects of the present invention will in part be obvious and in part specifically pointed out in the following description of an illustrative embodiment.

In the drawings annexed hereto and forming a part hereof,

Figure 1 is a part side elevational view and part vertical longitudinal section through one form of device constructed according to and embodying my invention, the plunger being shown in its normal retracted position;

Figure 2 is a similar view illustrating the position of the plunger in its extended position;

Figure 3 is a section on the line 3—3 of Figure 1; and

Figure 4 is a section on the line 4—4 of Figure 2.

The device is indicated generally by reference numeral 10, and is preferably formed in one piece of general S-shape in elevation, as by casting, molding, or otherwise, of suitable metallic, plastic material or the like, the desiderata in this connection being strength and lightness. Body 12 has formed therein an inwardly directed recess 14 along one side thereof, adjacent top 16, to define a handle 18 extending outwardly from body 12 at said side. A second, inwardly directed recess 20 is formed in body 12, along the other side edge thereof, spaced from the bottom, recess 20 defining an arm 22 along the bottom of the device, which arm extends in a direction opposite to the extension of handle 18. Thus, handle 18 and arm 22 extend from opposite side edges of body 12 and at opposite ends thereof.

Arm 22 is tapped, socketed or cored lengthwise thereof to define a receptacle 24 to receive and retain a tube or vial 26 containing the serum or other medicament to be used in treating the animals. Vial or tube 26 is locked in position within receptacle 24 by a set screw 28, although other means may be provided to lock vial 26 in the device during use. Vial 26 may be open at the end thereof inserted into receptacle 24, and stoppered as by cork 30, or otherwise. Thus, vial 26 may be removed from arm 22 on loosening of set screw 28 and refilled when desirable or necessary. The material of which vial 26 is made is such as to be penetrable by needles 32, 32 to permit access to the contents of the vial.

Body 12 is vertically cored or apertured as at 34, said aperture 34 extending completely through body 12 lengthwise thereof from top 16 to the upper margin of recess 20. A plunger 36 is disposed within aperture 34, topped by a head piece 38. A normally expanding coil spring 40 is disposed about plunger rod 36, trapped between head 38 and the top 16 of body 12, spring 40 normally urging plunger 36 upwardly of the device. A vertically extending groove 42 is formed in body 12 adjacent aperture 34 and in communication therewith at the upper portion of the aperture, said groove 42 receiving and guiding an integral finger piece 44 extending thereinto from plunger 36. The interfit of finger 44 in groove 42 serves to prevent plunger 36 from turning about its axis as it is depressed and returned to its original position during use. A cap screw 46, threaded into body 12 at the top adjacent groove 42, traps plunger 36 against withdrawal from the aperture 34, since the normal expansion of spring 40, as shown in Figure 1, will cause the plunger to rise until finger 44 bears against the underside of cap screw 46, overlying groove 42, at which point it will be held against further upward movement.

A pair of elongated needles 32, 32 are fixed to the bottom of plunger 36, so dimensioned as to be retained wholly within aperture 34 when the plunger is in its "up" position. Head 38 is adjacent handle 18, and when the device is held in one hand, the thumb may be rested atop head piece 38 to depress same, the movement causing needles 32, 32 to shift downwardly out of aperture 34, across recess 20 and into the vial 26 disposed in arm 22, which extends at an angle to the line of movement of the needles.

As the needles 32, 32 are immersed in the contents of vial 26, they pick up some of the material and retain same thereon during the withdrawal from the vial, when pressure on head 38 is relaxed or removed. In use, a wing of the alate animal being treated, or an ear of the livestock being treated, is inserted in recess 20 and held there by one hand of the operator. Holding the device by handle 18 with the other hand, the operator then depresses plunger 36 by thumb pressure on head piece 38, plunging the needles 32, 32 through the captive wing and into vial 26. When pressure on head 38 is relaxed or withdrawn, needles 32, 32 on their return stroke with plunger 36, under the expanding influence of coil spring 40, will wipe off the serum picked up by the needles on the particular engaged part of the animal being treated.

As the vial contents are exhausted or depleted, a new vial may be inserted in arm 22, or the original vial may be removed and refilled. The vial may be of any suitable material, as celluloid, or other plastic, glass, metal or the like, but I prefer a vial of transparent material to permit the operator to see the amount of material in the vial. When celluloid or other plastic material is employed in the formation of the vial, the needles will freely penetrate same and form their own openings in the initial stroke thereinto. The vials may thus be formed as sealed units, of relatively inexpensive material, and be disposed of when their contents are used, and they may be formed of any suitable size and shape to conform to the size and shape of the opening in arm 22. Set screw 28 holds vial 26 in its originally fixed position, so as to keep the openings thereinto in line with the needles' axes during subsequent passages of the needles into and out of arm 22. As seen in Figures 1 and 2, a well 27 may be formed at the bottom of vial 26 in line with needles 32, 32, in order to make it easier for the needles to pick up the last of the material contained in the vial.

As will be obvious from the foregoing, my device is simple in structure, assembly and operation, requiring relatively little skill to make, put together, or use same. The several parts can be formed easily and quickly, and the ease of operation of the device as a whole represents a substantial improvement over the art.

Having now described my invention, what I claim and desire to secure by Letters Patent is:

1. A device of the character described comprising a generally S-shaped body member, the top arm thereof comprising a handle, the bottom arm thereof being hollowed to receive a serum container, a needle-bearing plunger mounted on the body reciprocably shiftable therethrough at an angle to the bottom arm, and means on the plunger, normally positioned upwardly of the body member, operable from a point adjacent the top arm, to shift the needle into and out of the serum contained in the bottom arm.

2. The device of claim 1 in which the hollow in the bottom arm extends laterally thereof.

3. A device of the character described comprising an S-shaped member having a body portion, an aperture extending therethrough, a plunger reciprocably disposed within said aperture, spring means normally urging the plunger upwardly of the body, means to retain a portion of the plunger within the aperture, a needle on the bottom of the plunger and movable therewith, said needle being normally disposed within the aperture, the top arm of said S-member constituting a handle extending outwardly of the body adjacent the plunger, the lower arm of the S-member extending from the side of the body opposite the handle and spaced from the body, a container disposed within said lower arm in line with the plunger, pressure on the plunger against the biasing of the spring means, from a point adjacent the handle causing movement of the needle out of the aperture and into the container spaced therefrom, removal of the pressure causing return movement of the needle out of the container and back into the aperture.

ALFRED B. WILLSON.

REFERENCES CITED

The following references are of record in the file of this patent:

UNITED STATES PATENTS

| Number | Name | Date |
| --- | --- | --- |
| 230,073 | Seyfarth | July 13, 1880 |
| 385,056 | Jensen | June 26, 1888 |
| 917,739 | Owens | Apr. 6, 1909 |